US007843938B1

(12) United States Patent
Sutter et al.

(10) Patent No.: US 7,843,938 B1
(45) Date of Patent: Nov. 30, 2010

(54) QOS OPTIMIZATION WITH COMPRESSION

(75) Inventors: Paul Sutter, San Francisco, CA (US); Allen Samuels, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1002 days.

(21) Appl. No.: 11/066,992

(22) Filed: Feb. 25, 2005

(51) Int. Cl.
*H04L 12/28* (2006.01)
*H04L 12/56* (2006.01)
*H04J 3/17* (2006.01)

(52) U.S. Cl. .................. 370/395.21; 370/412; 370/433
(58) Field of Classification Search ................. 370/412, 370/399, 352, 395.21, 230.3, 395.43, 433, 370/465
See application file for complete search history.

(56) References Cited

U.S. PATENT DOCUMENTS

| | | | |
|---|---|---|---|
| 5,247,683 A | 9/1993 | Holmes et al. |
| 5,745,759 A | 4/1998 | Hayden et al. |
| 5,867,494 A | 2/1999 | Krishnaswamy et al. |
| 5,999,525 A | 12/1999 | Krishnaswamy et al. |
| 6,006,264 A | 12/1999 | Colby et al. |
| 6,016,535 A | 1/2000 | Krantz et al. |
| 6,029,175 A | 2/2000 | Chow et al. |
| 6,076,109 A | 6/2000 | Kikinis |
| 6,104,700 A | 8/2000 | Haddock et al. |
| 6,112,085 A | 8/2000 | Garner et al. |
| 6,181,711 B1 | 1/2001 | Zhang et al. |
| 6,249,844 B1 | 6/2001 | Schloss et al. |
| 6,292,835 B1 | 9/2001 | Huang et al. |
| 6,335,927 B1 | 1/2002 | Elliott et al. |
| 6,409,602 B1 | 6/2002 | Wiltshire et al. |
| 6,449,283 B1 | 9/2002 | Chao et al. |
| 6,452,915 B1 | 9/2002 | Jorgensen |
| 6,502,131 B1 | 12/2002 | Vaid et al. |
| 6,553,376 B1 | 4/2003 | Lewis et al. |
| 6,640,248 B1 | 10/2003 | Jorgensen |
| 6,697,368 B2 | 2/2004 | Chang et al. |
| 6,731,625 B1 | 5/2004 | Eastep et al. |
| 6,735,218 B2 | 5/2004 | Chang et al. |
| 6,754,181 B1 | 6/2004 | Elliott et al. |

(Continued)

FOREIGN PATENT DOCUMENTS

WO    WO-03/048936 A1    6/2003

(Continued)

*Primary Examiner*—Chirag G Shah
*Assistant Examiner*—Srinivasa R Reddivalam
(74) *Attorney, Agent, or Firm*—Christopher McKenna; Daniel E. Rose

(57) ABSTRACT

A method and system for optimizing network traffic settings and for providing information on projected optimization of transformed traffic for a network includes: providing a traffic descriptor for sampled traffic data of the network; transforming the traffic data and extracting information on the transformed traffic data; and providing the traffic descriptor and the information on the transformed traffic data for analysis. The information can be a transformation traffic descriptor or a delta between untransformed and transformed network traffic. The traffic data and the transformed traffic data can then be modeled based the traffic descriptor and the information, respectively. Bandwidth requirements and quality of service settings for optimizing network performance for a service level can be provided based upon the traffic data model. Information on projected optimization of transformed network traffic can also be provided for the service level based upon the transformed traffic data model.

24 Claims, 6 Drawing Sheets

U.S. PATENT DOCUMENTS

| | | |
|---|---|---|
| 6,785,237 B1 * | 8/2004 | Sufleta .................... 370/236 |
| 6,819,658 B1 | 11/2004 | Agarwal et al. |
| 6,842,780 B1 | 1/2005 | Frei et al. |
| 6,842,906 B1 | 1/2005 | Bowman-Amuah |
| 6,877,043 B2 | 4/2005 | Mallory et al. |
| 6,882,634 B2 | 4/2005 | Bagchi et al. |
| 6,888,844 B2 | 5/2005 | Mallory et al. |
| 6,889,249 B2 | 5/2005 | Miloushev et al. |
| 6,891,881 B2 | 5/2005 | Trachewsky et al. |
| 6,898,204 B2 | 5/2005 | Trachewsky et al. |
| 6,909,708 B1 | 6/2005 | Krishnaswamy et al. |
| 6,918,113 B2 | 7/2005 | Patel et al. |
| 6,954,800 B2 | 10/2005 | Mallory |
| 6,954,877 B2 | 10/2005 | Earl et al. |
| 6,975,655 B2 | 12/2005 | Fischer et al. |
| 6,988,236 B2 | 1/2006 | Ptasinski et al. |
| 6,993,101 B2 | 1/2006 | Trachewsky et al. |
| 7,000,031 B2 | 2/2006 | Fischer et al. |
| 7,023,979 B1 | 4/2006 | Wu et al. |
| 7,035,285 B2 | 4/2006 | Holloway et al. |
| 7,103,068 B1 | 9/2006 | Gardner et al. |
| 7,116,894 B1 | 10/2006 | Chatterton |
| 7,145,898 B1 | 12/2006 | Elliott |
| 7,167,451 B1 | 1/2007 | Oran |
| 7,185,192 B1 | 2/2007 | Kahn |
| 7,240,150 B1 | 7/2007 | Todd et al. |
| 7,385,924 B1 * | 6/2008 | Riddle .................... 370/235 |
| 7,546,353 B2 | 6/2009 | Hesselink et al. |
| 2001/0052012 A1 | 12/2001 | Rinne et al. |
| 2002/0038388 A1 | 3/2002 | Netter |
| 2002/0049833 A1 | 4/2002 | Kikinis |
| 2002/0083183 A1 | 6/2002 | Pujare et al. |
| 2002/0089972 A1 | 7/2002 | Chang et al. |
| 2002/0089977 A1 | 7/2002 | Chang et al. |
| 2002/0090006 A1 | 7/2002 | Chang et al. |
| 2002/0091884 A1 | 7/2002 | Chang et al. |
| 2002/0097713 A1 | 7/2002 | Chang et al. |
| 2002/0105942 A1 * | 8/2002 | Ahmadi et al. .............. 370/352 |
| 2003/0009538 A1 | 1/2003 | Shah et al. |
| 2003/0152028 A1 * | 8/2003 | Raisanen et al. ............ 370/235 |
| 2003/0177389 A1 | 9/2003 | Albert et al. |
| 2003/0182423 A1 | 9/2003 | Shafir et al. |
| 2003/0198189 A1 | 10/2003 | Roberts et al. |
| 2003/0217166 A1 | 11/2003 | Dal Canto et al. |
| 2004/0128346 A1 | 7/2004 | Melamed et al. |
| 2004/0141525 A1 | 7/2004 | Bhushan et al. |
| 2005/0025064 A1 * | 2/2005 | Chang et al. ................ 370/252 |
| 2005/0089049 A1 | 4/2005 | Chang et al. |
| 2005/0102414 A1 * | 5/2005 | Hares et al. ................ 709/232 |
| 2005/0144186 A1 | 6/2005 | Hesselink et al. |
| 2005/0149481 A1 | 7/2005 | Hesselink et al. |
| 2005/0249220 A1 * | 11/2005 | Olsen et al. ............. 370/395.4 |
| 2006/0215556 A1 | 9/2006 | Wu et al. |
| 2007/0115906 A1 | 5/2007 | Gao et al. |
| 2007/0245409 A1 | 10/2007 | Harris et al. |

FOREIGN PATENT DOCUMENTS

| | | |
|---|---|---|
| WO | WO 2004/088937 | 10/2004 |
| WO | WO-2005/114375 | 12/2005 |

* cited by examiner

QOS OPTIMIZATION WITH COMPRESSION

BACKGROUND

1. Field

The present invention relates to the optimization of network traffic settings and to providing information on projected compression of the network traffic.

2. Related Art

Data networks are well known in the art. The traffic of data networks is composed of transactions or packets from different types of sources. The monitoring of this traffic and the ability to change network settings in response to changes in the network are important to the efficient provisioning of bandwidth resources and to the quality of service for different traffic flows. The more efficient the bandwidth is provisioned, the less packet loss and/or delay results.

However, conventional monitoring systems typically provide network traffic information with insufficient detail or resolution. Thus, the network is configured or reconfigured to less than optimal states. In addition, these systems cannot provide information on how the network performance would change with certain transformations of to the traffic, such as compression or traffic suppression.

Accordingly, there exists a need for a method and system for optimizing network traffic settings and for providing information on projected optimization of transformed network traffic. The method and system should provide information concerning the network traffic with sufficient detail to optimize the performance of the network, while also providing information on the optimized network traffic if the traffic was transformed. The present invention addresses such a need.

SUMMARY

A method and system for optimizing network traffic settings and for providing information on projected optimization of transformed traffic for a network includes: providing a traffic descriptor for sampled traffic data of the network; transforming the traffic data and extracting information on the transformed traffic data; and providing the traffic descriptor and the information on the transformed traffic data for analysis. The information can be a transformation traffic descriptor or a delta between untransformed and transformed network traffic. The traffic data and the transformed traffic data can then be modeled based the traffic descriptor and the information, respectively. Bandwidth requirements and quality of service settings for a service level for optimizing network performance can be provided based upon the traffic data model. Information on projected optimization of transformed network traffic for the service level can also be provided based upon the transformed traffic data model.

DETAILED DESCRIPTION

Figure 1:
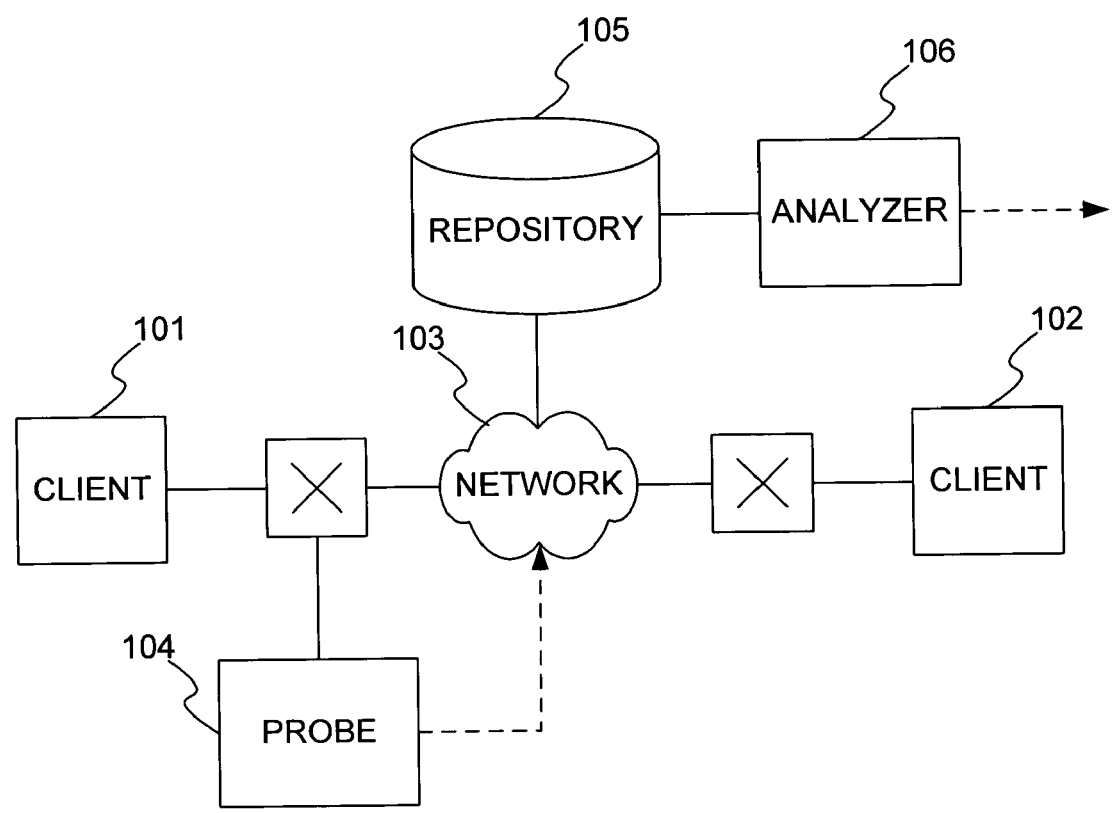
FIG. 1 is a diagram illustrating a preferred embodiment of a system for optimizing network traffic settings and for providing information on projected optimization of transformed network traffic in accordance with the present invention.

FIG. 1 is a diagram illustrating a preferred embodiment of a system for optimizing network traffic settings and for providing information on projected optimization of transformed network traffic in accordance with the present invention. The system includes a network 103 with traffic traversing between a plurality of clients 101-102. Although only two clients are illustrated in FIG. 1, any number of clients can be part of the network 103. A probe 104 is coupled to the network 103 at a certain point and monitors the network traffic traversing that point. The point can be a link, router, or any location in the network 103 where there is a queue. In the preferred embodiment, the probe 104 samples the traffic data via a mirror port, but other means of sampling the traffic data can be used. Information concerning the traffic data over a period of time is then extracted and used to create one or more traffic descriptors. For example, a separate traffic descriptor can be created for each class of traffic, such as video, voice, etc. The traffic descriptor is then sent over the network 103 to a repository 105. The traffic data is also transformed by the probe 104. Information concerning the transformed traffic data is then extracted and used to create a transformation traffic descriptor, which are then sent over the network 103 to the repository 105. Examples of traffic data transformation include compression, traffic suppression (such as the suppression of peer-to-peer traffic), security (such as firewalls), or any other type of traffic data changes that can be applied. Other probes (not shown) throughout the network 103 also send traffic descriptors and transformation traffic descriptors to the repository 105. An analyzer 106 then can use a plurality of the traffic descriptors in the repository 105 to model the network traffic. The analyzer 106 determines the real-time bandwidth requirements for the network traffic and the quality of service (QoS) settings for optimal performance at a certain service level. A service level is a metric-driven description of expected network service, usually expressed in terms of packet loss, jitter, and latency. QoS settings are packet queuing and prioritization settings in a network equipment. The QoS settings determined by the analyzer 106 are thus those that achieve the specified service level for the bandwidth requirement. The analyzer 106 also uses a plurality of the transformation traffic descriptors in the repository 105 to project the changes in network performance if the transformed traffic data was optimized at the service level.

Figure 2:
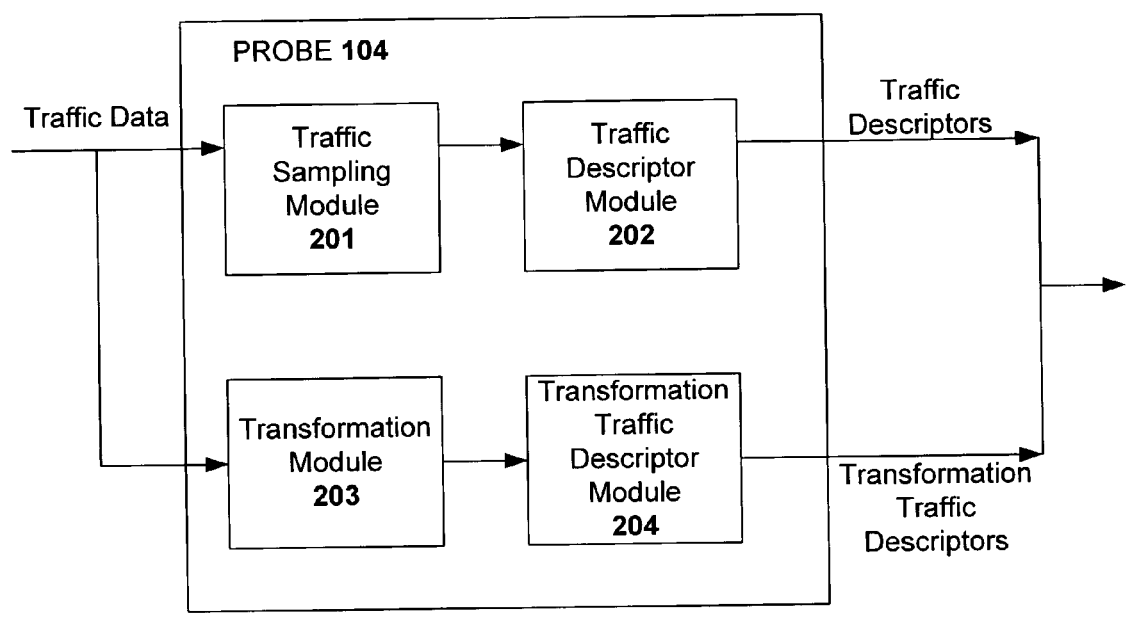
FIGS. 2 and 3 are diagrams illustrating a preferred embodiment of a probe and a method, respectively, for optimizing network traffic settings and for providing information on projected optimization of transformed network traffic in accordance with the present invention.
Figure 3:
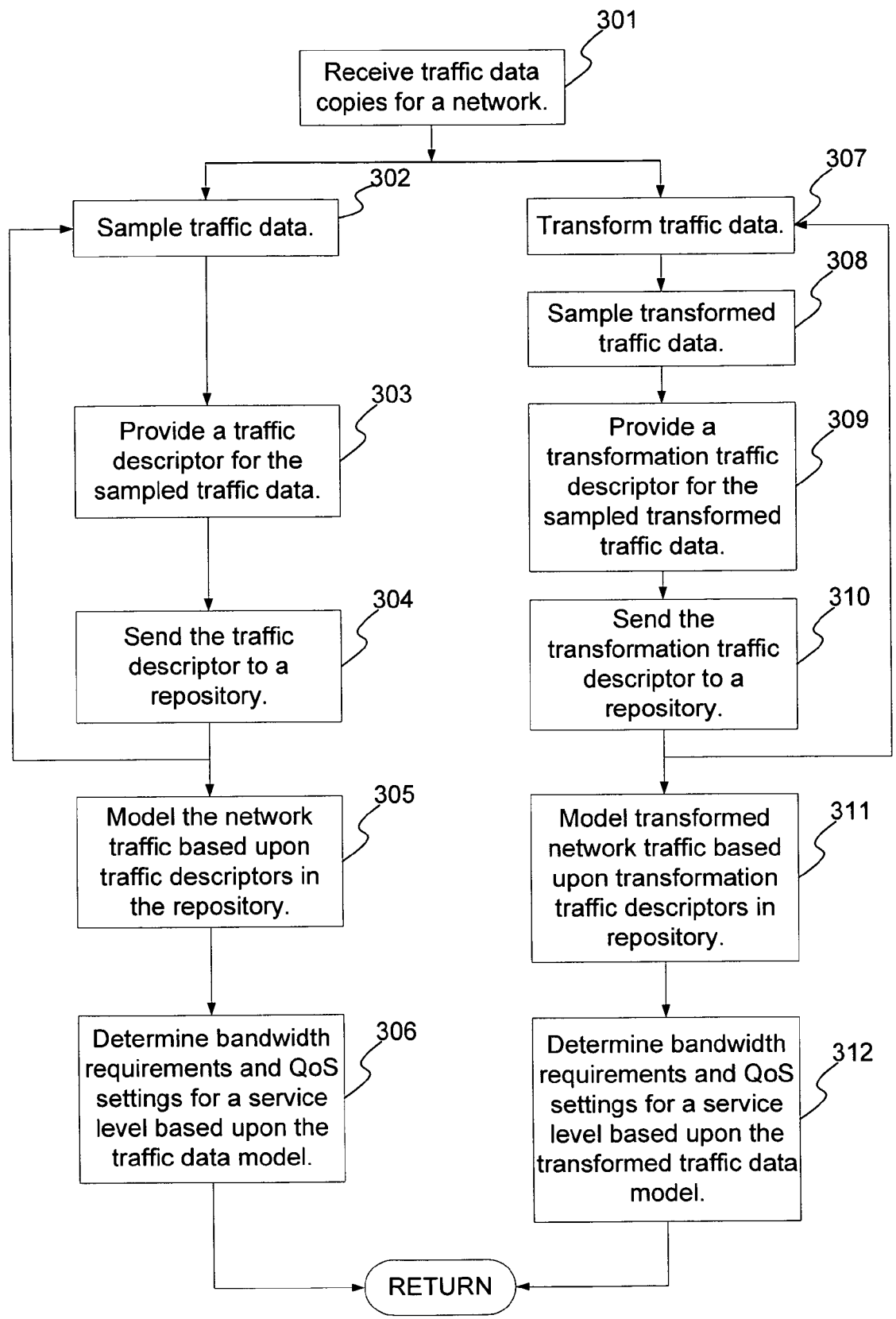

FIGS. 2 and 3 are diagrams illustrating a preferred embodiment of a probe and a method, respectively, for optimizing network traffic settings and for providing information on projected optimization of transformed network traffic in accordance with the present invention. The probe 104 receives the traffic data as input, via step 301. The traffic data are then sampled by a traffic sampling module 201, via step 302. Here, the sampling is performed at a fine granularity. The traffic descriptor module 202 then creates a traffic descriptor for sampled traffic data over a predetermined period of time, via step 303. For example, the traffic data can be sampled every five milliseconds for a period of five minutes. A traffic descriptor for the sampled traffic in this five minutes period can then be created. This traffic descriptor is then sent to the repository 105, via step 304. Steps 302 through 304 can be reiterated as often as desired.

The transformation module 203 applies changes to the traffic data, via step 307. The transformed traffic data is then sampled, via step 308, and a transformation traffic descriptor module 204 creates a transformation traffic descriptor for the sampled transformed traffic data, via step 309. In this embodiment, since the traffic data is received via a mirror port, copies of the traffic data, rather than the actual traffic data, is transformed. Thus, the transformation traffic descriptor contains information on projected transformation of the traffic data. The transformation traffic descriptor is then sent to the repository 105, via step 310. Steps 307 through 310 can be reiterated as often as desired.

The analyzer 106 can then model the network traffic based upon a plurality of traffic descriptors in the repository 105, via step 305. The analyzer 106 can also model the transformed network traffic based upon the transformation traffic descriptors in the repository 105, via step 311. At least two sets of information can then be obtained from the models. First, the bandwidth requirements and the QoS settings for optimizing performance for a certain service level can be determined based upon the traffic data model, via step 306. Second, information on the projected bandwidth requirements and QoS settings for the transformed the network traffic for the service level can be determined based upon the transformed traffic data model, via step 312. With the first set of information, real-time optimization of the network can be provided. With the second set of information, the effects of optimizing transformed network traffic can be provided prior to the application of any actual transformation.

Multiple types of transformation may be modeled, with descriptors concerning each of these transformations provided, without departing from the spirit and scope of the present invention. For example, unwanted traffic, such as peer-to-peer (P2P) file sharing, can be suppressed. This P2P suppressed traffic is then sampled and descriptors created. The P2P suppressed traffic can then be modeled using the descriptors, and from this model, bandwidth requirements and QoS settings for the optimization of P2P suppressed traffic for a certain service level is provided.

Figure 4:
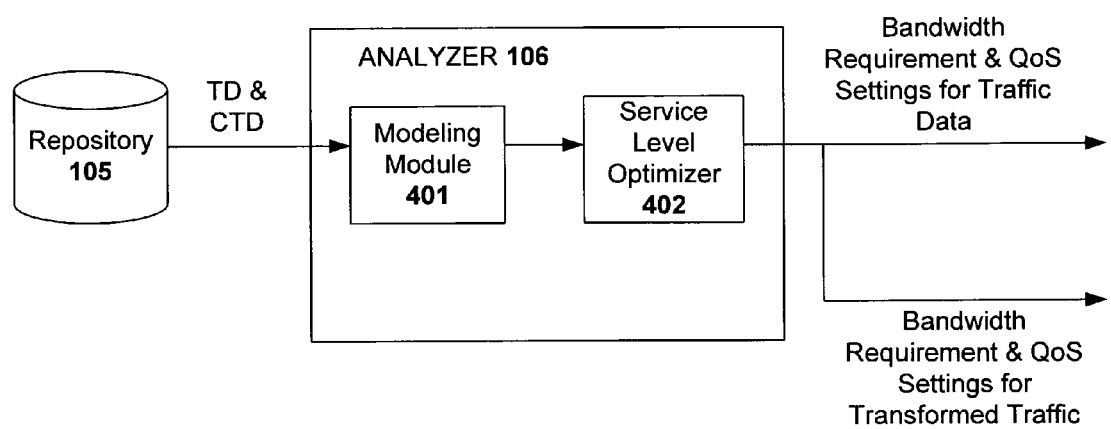
FIG. 4 is a diagram illustrating a preferred embodiment of the analyzer in accordance with the present invention.

FIG. 4 is a diagram illustrating a preferred embodiment of the analyzer in accordance with the present invention. The analyzer 106 receives a plurality of traffic descriptors and transformation traffic descriptors from the repository 105. The traffic descriptors and transformation traffic descriptors can be from a plurality of probes at different locations in the network. A modeling module 401 of the analyzer 106 then models the network traffic and the transformed network traffic based the traffic descriptors and the transformation traffic descriptors, respectively. A service level optimizer 402 uses the network traffic model to determine QoS settings that would optimize network performance at a certain service level. The bandwidth requirements and the QoS settings are then outputted by the analyzer 106. The transformed network traffic model is used to determine the effects of the optimization of transformed network traffic on network performance at the service level. This information is also outputted by the analyzer 106.

In this manner, information concerning the network traffic is provided with sufficient detail to optimize the performance of the network, while also providing information on the projected optimization of transformed network traffic.

Although the present invention is described above with traffic descriptors and compression traffic descriptors, other ways of providing compression information can be used without departing from the spirit and scope of the present invention.

Figure 5:
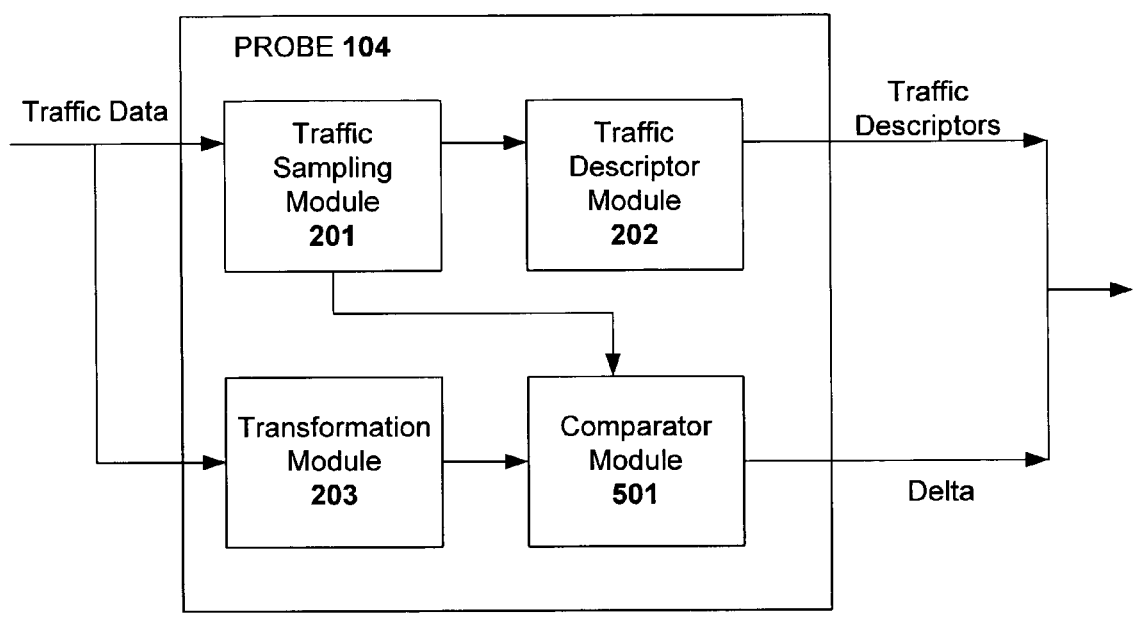
FIG. 5 is a diagram illustrating an alternative embodiment of the probe in accordance with the present invention.

For example, FIG. 5 is a diagram illustrating an alternative embodiment of the probe in accordance with the present invention. In this embodiment, instead of creating a transformation traffic descriptor, a comparator module 501 compares the transformed traffic from the transformation module 203 with the untransformed traffic from the traffic sampling module 201. The "delta" between the transformed and untransformed traffic is then sent to the repository 105.

Figure 6:
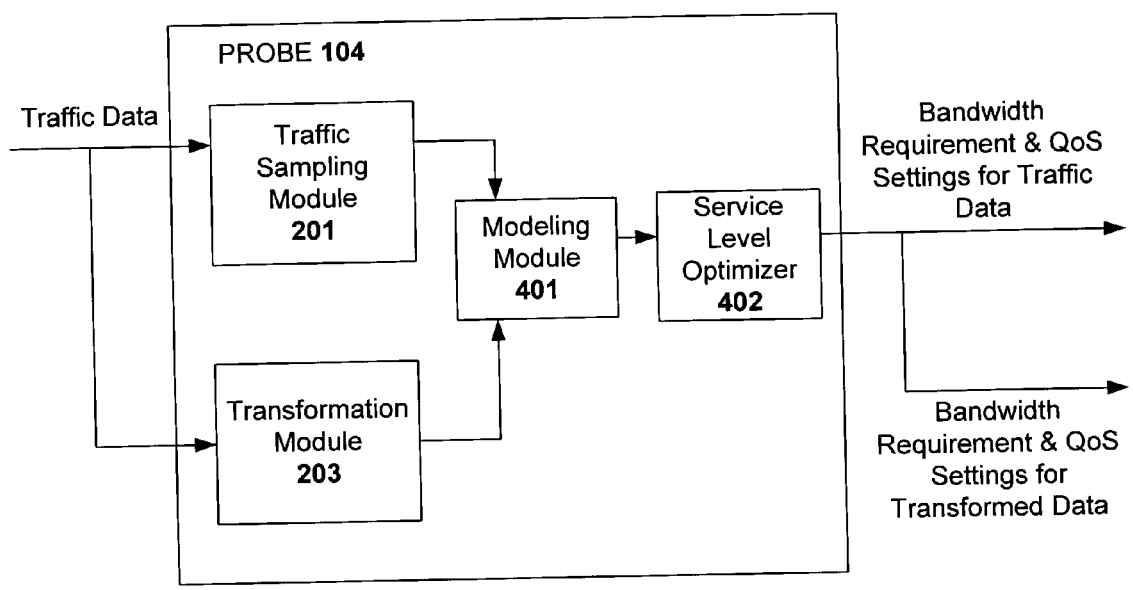
FIG. 6 is a diagram illustrating another alternative embodiment of the probe in accordance with the present invention.

For another example, FIG. 6 is a diagram illustrating another alternative embodiment of the probe in accordance with the present invention. In this embodiment, the analysis of the traffic data is performed within the probe 104. The sampled traffic data and the sampled transformed traffic data are used directly by the modeling module 401. No traffic descriptors or transformation traffic descriptors need be sent to a repository. The two sets of information can then be determined as described above.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for optimizing network traffic settings, the method comprising steps of:
    (a) receiving, by an intermediary deployed between a first device and a second device, network traffic comprising data communicated between the first device and the second device via a network, storing a mirror copy of the data of the network traffic to a repository of the intermediary, and forwarding the network traffic to the second device;
    (b) transforming, by the intermediary, the mirror copy of the network traffic by one of compression or suppression to provide a transformed mirror copy of the data of the network traffic different than the forwarded network traffic, the transformed mirror copy comprising a transformed version of the data;
    (c) sampling, by the intermediary, portions of the transformed mirror copy of the network traffic; and
    (d) determining, by an analyzer of the intermediary, a bandwidth requirement of the network traffic and Quality of Service (QoS) setting of the intermediary for a predetermined service level based on the transformed sampled portions of the mirror copy of the network traffic.

2. The method of claim 1, wherein step (a) further comprises receiving, by the intermediary, a mirror of network traffic communicated between the first device and the second device via a mirror port and storing the mirrored network traffic as the mirror copy of the network traffic in the repository.

3. The method of claim 1, wherein step (c) further comprises sampling, by the intermediary, the transformed mirror copy of the network traffic over a predetermined period of time.

4. The method of claim 1, wherein step (a) further comprises the network traffic communicated between the first device and the second device traversing the intermediary device.

5. The method of claim 1, wherein step (b) further comprises transforming, by the intermediary, the sampled mirror copy of network traffic by applying security changes.

6. The method of claim 1, wherein the predetermined service level comprises one of packet loss, jitter or latency.

7. The method of claim 1, wherein step (d) further comprises determining, by the analyzer of the intermediary, one of a packet queuing setting or a prioritization setting of a network equipment.

8. The method of claim 1, wherein step (d) further comprises determining, by the analyzer of the intermediary, a projected bandwidth requirement of the network traffic and a projected QoS setting of the intermediary based on the transformed network traffic.

9. The method of claim 1, wherein step (a) further comprises sampling, by the intermediary, portions of the received network traffic, and storing the sampled portions as the mirror copy of the network traffic to the repository.

10. The method of claim 1, wherein step (d) further comprises determining for non-transformed network traffic, by the analyzer of the intermediary, a real-time bandwidth requirement of the network traffic and QoS setting of the intermediary for the predetermined service level.

11. A system configured on a device deployed as an intermediary between a first device and a second device for optimizing network traffic settings, the system comprising
a probe of an intermediary device deployed between a first device and a second device receiving network traffic comprising data communicated between the first device and the second device via a network, storing a mirror copy of the data of the traffic to a repository of the intermediary device, and forwarding the network traffic to the second device;
a transformation module of the intermediary device transforming the mirror copy of the network traffic by one of compression or suppression to provide a transformed mirror copy of the network traffic different than the forwarded network traffic, the transformed mirror copy comprising a transformed copy of the data;
a sampling module of the intermediary device sampling portions of the transformed mirror copy of the network traffic; and
an analyzer of the intermediary device determining a bandwidth requirement of the network traffic and Quality of Service (QoS) setting of the intermediary for a predetermined service level based on the transformed sampled portions of the mirror copy of the network traffic.

12. The system of claim 11, wherein the probe receives a mirror of network traffic communicated between the first device and the second device via a mirror port and stores the mirrored network traffic as the copy of the network traffic in the repository.

13. The system of claim 11, wherein the sampling module samples the transformed network traffic over a predetermined period of time.

14. The system of claim 11, wherein the network traffic communicated between the first device and the second device traverses the probe.

15. The system of claim 11, wherein the transformation module transforms the sampled copy of network traffic by applying security changes.

16. The system of claim 11, wherein the predetermined service level comprises one of packet loss, jitter or latency.

17. The system of claim 11, wherein the analyzer determines one of a packet queuing setting or a prioritization setting of a network equipment.

18. The system of claim 11, wherein the analyzer determines a projected bandwidth requirement of the network traffic and a projected QoS setting of the intermediary based on the transformed network traffic.

19. The system of claim 11, wherein the sampling module samples portions of the received network traffic and stores the sampled portions as the copy of the network traffic in the repository.

20. The system of claim 19, wherein the analyzer determines for non-transformed network traffic a real-time bandwidth requirement of the network traffic and QoS setting of the intermediary for the predetermined service level.

21. An article of manufacture comprising:
a non-transitory computer usable medium having computer readable program code means embodied therein for optimizing network traffic settings, the computer readable program code means in said article of manufacture comprising:
computer readable program code means for receiving at an intermediary deployed between a first device and a second device network traffic comprising data communicated between the first device and the second device via a network, storing a mirror copy of the data of the network traffic to a repository, and forwarding the network traffic to the second device;
computer readable program code means for transforming the mirror copy of the network traffic by one of compression or suppression to provide a transformed mirror copy of the network traffic different than the forwarded network traffic, the transformed mirror copy comprising a transformed version of the data;
computer readable program code means for sampling portions of the transformed mirror copy of the network traffic; and
computer readable program code means for determining, by an analyzer of the intermediary, a bandwidth requirement of the network traffic and Quality of Service (QoS) setting of the intermediary for a predetermined service level based on the transformed sampled portions of the mirror copy of the network traffic.

22. The article of manufacture of claim 21, further comprising computer readable program code means for determining for non-transformed network traffic a real-time bandwidth requirement of the network traffic and QoS setting of the intermediary for the predetermined service level.

23. The article of manufacture of claim 21, further comprising computer readable program code means for determining a projected bandwidth requirement of the network traffic and a projected QoS setting of the intermediary based on the transformed network traffic.

24. A method for optimizing network traffic settings, the method comprising steps of:
receiving, by an intermediary deployed between a first device and a second device, network traffic comprising data communicated between the first device and the second device via a network;
storing a mirror copy of the data of the network traffic to a repository of the intermediary;
forwarding, by the intermediary, the network traffic to the second device;
transforming, by the intermediary, the mirror copy of the network traffic by one of compression or suppression to provide a transformed mirror copy of the network traffic different than the forwarded network traffic, the transformed mirror copy comprising a transformed version of the data;

sampling, by the intermediary, portions of the transformed mirror copy of the network traffic; and comparing, by the intermediary, the mirror copy of the network traffic stored in the repository and the sampled portions of the transformed mirror copy of the network traffic;

determining, by an analyzer of the intermediary and based on the comparison, a bandwidth requirement of the network traffic and Quality of Service (QoS) setting of the intermediary for a predetermined service level.

* * * * *